United States Patent [19]

Tajiri et al.

[11] Patent Number: 5,238,659
[45] Date of Patent: Aug. 24, 1993

[54] MOVING GRANULAR BED DUST REMOVAL AND REACTION APPARATUS

[75] Inventors: Hironori Tajiri; Kenji Kamei, both of Kobe, Japan

[73] Assignee: Kawasaki Jukogyo Kabushiki Kaisha, Kobe, Japan

[21] Appl. No.: 758,475

[22] Filed: Sep. 6, 1991

Related U.S. Application Data

[63] Continuation of Ser. No. 527,586, May 23, 1990, abandoned.

[30] Foreign Application Priority Data

May 23, 1989 [JP] Japan .............................. 1-58707[U]

[51] Int. Cl.⁵ ............................................. B01J 8/12
[52] U.S. Cl. ...................................... 422/216; 55/479; 422/177; 422/219
[58] Field of Search ............... 422/216, 218, 219, 176, 422/177, 168; 55/479

[56] References Cited

U.S. PATENT DOCUMENTS

| | | | |
|---|---|---|---|
| 2,594,289 | 4/1952 | Caldwell | 422/216 X |
| 2,647,859 | 8/1953 | Barker | 422/216 X |
| 2,734,805 | 2/1956 | Savage et al. | 422/216 |
| 2,780,310 | 2/1957 | Schaub | 422/216 X |
| 4,003,711 | 1/1977 | Hishinuma et al. | 422/177 X |
| 4,179,399 | 12/1979 | Lichtenberger et al. | 422/216 X |
| 4,254,616 | 3/1981 | Siminski et al. | 422/216 X |
| 4,255,403 | 3/1981 | Mayer et al. | 422/216 X |

FOREIGN PATENT DOCUMENTS 60-24326 7/1983 Japan .

*Primary Examiner*—Robert J. Warden
*Assistant Examiner*—Amalia Santiago

[57] ABSTRACT

A moving granular bed dust removal and reaction apparatus using glanular reaction agent as a granular bed material comprises a generally cylindrical, air-tight vessel disposed vertically, which has a gas outlet port, a reaction agent supply port and a reaction agent storage portion in an upper portion thereof, a gas inlet port, a gas chamber connected to the gas inlet port and a reaction agent passage defined in the gas chamber by a louver device in an intermediate portion and a lower portion having a regulatable discharge device. The reaction agent passage of the intermediate portion is communicated with a lower end of the reaction agent storage portion form a single column of reation agent. The regulatable discharge device regulates the moving speed of granular reaction agent supplied through the reaction agent supply port and allows it to move down by gravity to fill the single reaction agent column while filtering and adsorbing dust and toxic substances contained in upwardly moving gas therethrough.

1 Claim, 5 Drawing Sheets

MOVING GRANULAR BED DUST REMOVAL AND REACTION APPARATUS

This application is a continuation of application Ser. No. 07/527,586, filed May 23, 1990 now abandoned.

FIELD OF THE INVENTION AND RELATED ART STATEMENT

The present invention relates to a structure of an apparatus for dust removal, desulfurization and denitrification, etc., from coal gasified gas or exhaust gas of a high pressure circulating fluidized bed boiler, etc.

Such gas usually contains powdered dust such as fly-ash and/or carbon dust and toxic gas such as hydrogen sulfides, sulfur dioxide and/or NOx and it is highly desired to remove them before discharge to atomsphere.

FIG. 8 is a schematic cross section of such conventional dry type flue gas desulfurizing apparatus as disclosed in Japanese Utility Model Application Laid-open No. 24326/1985.

In FIG. 8, exhaust gas containing toxic gas such as sulfur dioxide is supplied through an exhaust gas inlet 52 of a casing 51 is diffused therein and enters into a desulfurizing region 62 through a louver 58 provided in the casing. The desulfurizing region 62 is defined by the louver 58 a screen 60 on a gas exit side thereof and a wall of the casing 51. An activated carbon supply port 54 and an activated carbon discharge port 55 are provided above and below the desulfurizing region 62, respectively, so that the latter is filled with activated carbon supplied through the activated carbon supply port 54 and moving down by gravity. Sulfides contained in exhaust gas flown into the desulfurizing region 62 through the louver 58 are adsorbed by relatively large activated carbon particles and dust having relatively large particle size is trapped in between activated carbon particles and by the screen 60, while passing through the desulfurizing region 62.

A dust removal region 63 is arranged in a downstream side of the desulfurizing region 62 in the casing 51. The dust removal region 63 has a similar structure to that of the desulfurizing region 62 except that it is filled with granular bed material having particle size smaller than that of activated carbon in the desulfurizing region 62. Exhaust gas flown from the desulfurizing region 62 passes through louver 59 to granular bed material which collects fine dust in exhaust gas and, after passed through the screen 61 discharged from the casing 51 through a gas discharge port 53.

A granular bed material supply port 56 and a particle discharge port 57 are provided above and below the dust removal region 63, respectively. Collected dust, fine particles of activated carbon carried from the desulfurizing region 62 along with exhaust gas and granular bed material are discharged through the particle discharge port 57, continuously. In order to maintain the dust removal region 63 always filled with clean granular bed material, fresh granular bed material is continuously supplied thereto through the granular bed material supply port 56.

In the conventional apparatus mentioned above, desulfurization and dust removal for fluid such as gas containing dust and toxic gas such as hydrogen sulfide and sulfur dioxide are performed within a single vessel. In such case, however, it is necessary for removal of sulfides contained in exhaust gas to keep exhaust gas in contact with activated carbon in the desulfurizing region 62 for a time longer enough than a certain time. Further, in a case such as shown in FIG. 8 where flowing direction of exhaust gas is in perpendicular to the layer of activated carbon, it is necessary to make a thickness of desulfurizing region in a gas flowing direction large enough. Further, in a case where feeding and discharging speed of activated carbon for the desulfurizing region is relatively low, dust may be accumulated in the desulfurizing region causing pressure loss to occur. When, in order to solve this problem, the feeding and discharging speed of activated carbon are increased, power required to do is increased, necessarily.

In order to remove such problem, it can be considered to arrange the dust removal region in a upstream of the desulfurizing region. In such case, however, fine particles of activated carbon from the desulfurizing region may be mixed in exhaust gas to be discharged to atomosphere. That is, another dust removing layer must be provided downstream of the desulfurizing region.

Further, in the conventional apparatus, desulfurizing agent in the desulfurizing region and dust filtering agent in the dust removal region are different, which requires separate peripheral apparatus such as lock hoppers in an upper and a lower portions of each region, causing cost to be increased.

OBJECT AND SUMMARY OF THE INVENTION

An object of the present invention is to provide an apparatus having a simple construction and capable of performing reliable reaction such as desulfurization, denitrification and dust removal.

The above object can be achieved according to the present invention by a provision of a moving granular bed dust removal and reaction apparatus, the apparatus comprises a generally cylindrical, air-tight vessel disposed vertically, the vessel including an upper portion formed in a top portion thereof with a gas outlet port and a reaction agent supply port and defining in a lower portion thereof a reaction agent storage portion, an intermediate portion having a gas inlet port, a gas chamber connected to the gas inlet port and a reaction agent passage defined in the gas chamber by louver means, the reaction agent passage of the intermediate portion being communicated with a lower end of the reaction agent storage portion and a lower portion including a discharging device provided in a bottom of the lower portion, granular reaction agent as a granular bed material and reaction agent being supplied through the reaction agent supply port into the vessel and filling the reaction agent storage portion, the reaction agent passage of the intermediate portion and the lower portion while moving down by gravity at a regulatable speed, the gas inlet port and the gas outlet port being communicated with each other through reaction agent filling at least the reaction passage of the intermediate portion and the reaction agent storage portion, gas flowing upwardly through the reaction agent storage portion at a lower speed than that in the reaction agent passage of the intermediate portion.

A vertical length of the reaction agent storage passage is preferably selected such that a time required for exhaust gas to pass therethrough is longer than a time necessary to complete a gas adsorbing of reaction agent therein. In such case, a cross sectional area of the region is preferably made larger than that of a portion of the vessel below the region so that speed of upwardly moving gas and going down speed of reaction agent are lowered. In this case, it is possible to reduce the vertical length of the region.

DETAILED DESCRIPTION OF THE PREFERRED EMBODIMENTS

In order to clarify the principle of the present invention, some experiments conducted by the inventors will be described first with reference to FIGS. 5 to 7 and, then, embodiments of the present invention will be described in detail.

Figure 5:
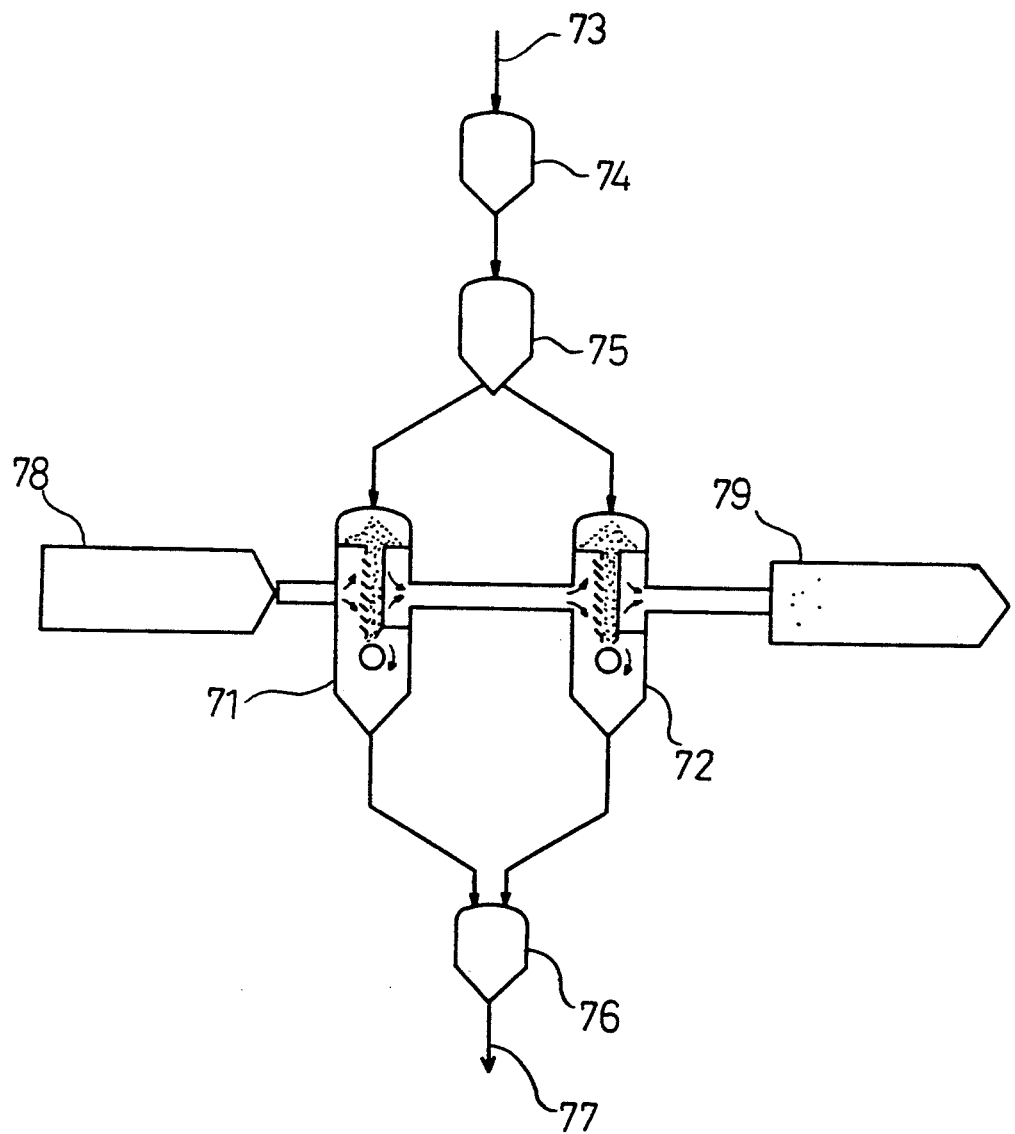
FIG. 5 is a block diagram of a system used to confirm the effect obtained by the present invention.

In FIG. 5 which shows an apparatus used in these experiment, it includes a first dust collector 71, a second dust collector 72 series connected to the first dust collector 71, filter material 73, filter material supply tanks 74 and 75, a filter material discharge tank 76, a mixture 77 of filter material and dust, gas 78 containing dust and purifier gas 79.

Each dust collector is provided at a center portion of a container thereof on the gas inlet side with a louver and on the gas outlet side with a metal mesh and defines a space between the louver, the mesh and a container side wall, which is filled with filter material. The dust collector further is connected at a lower portion of the space to a variable speed, filter material discharge device 76 and at an upper portion to the filter material supply tank 75 to which filter material is supplied from the supply tank 74. The variable speed filter material discharge device 76 serves to make flow rate of filter material in the space variable under high pressure.

Figure 6:
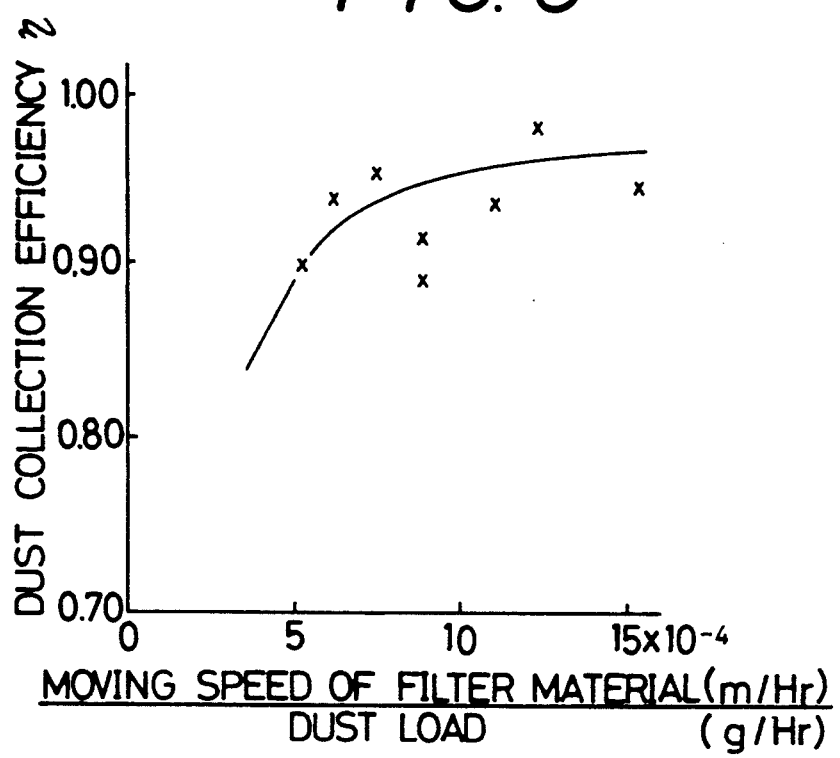
FIGS. 6 and 7 are graphs showing the effect of the present invention.
Figure 7:
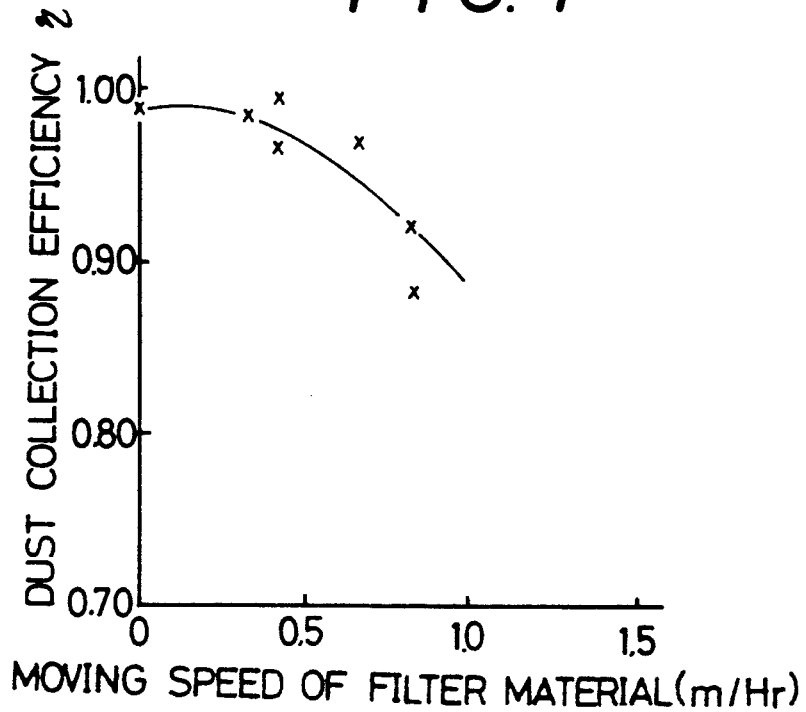
Figure 8:
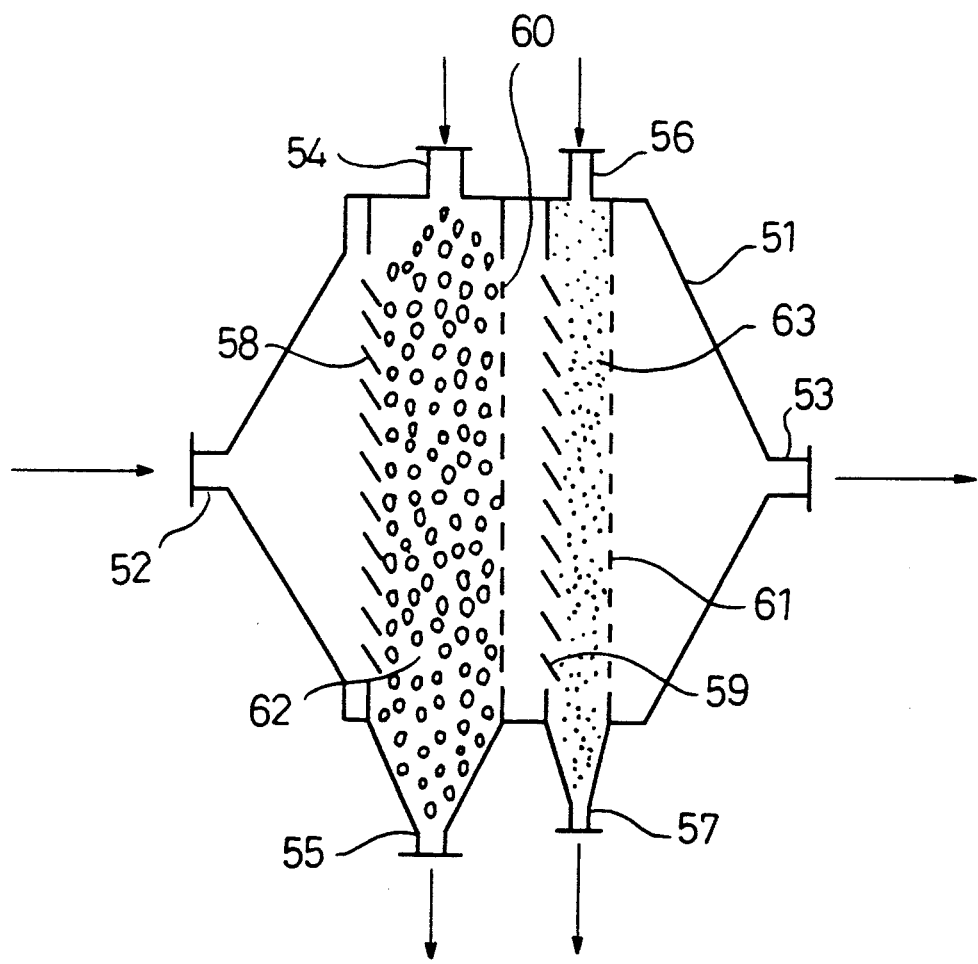
FIG. 8 shows a conventional apparatus schematically.

By changing dust density of gas, flowing speed of filter material in the dust collectors 71 and 72, data are obtained, which are shown in FIGS. 6 and 7.

(1) In the dust collector 71 in the upstream, since, as shown in FIG. 6, dust collection efficiency is abruptly lowered when a ratio of moving speed (m/Hr) or filter material in the space to dust load (g/Hr) becomes smaller than a limit (about $6 \times 10^{-4}$ m/g in FIG. 6), it is necessary to maintain the moving speed of filter material at a value above the limit when dust load is constant.

(2) In the second dust collector 72 in the downstream, a high dust collection efficiency is obtained, as shown in FIG. 7, by restricting the moving speed of filter material below a certain constant value since gas supplied thereto contains less dust.

Summarizingly, it is possible to obtain a high dust collection efficiency by increasing moving speed of filter material in the first dust collector to prevent a clogging of filter material layer and hence blowing out of gas containing high dust content through un-clogged portion of the filter layer from occurring and by lowering the moving speed in the second dust collector to enhance dust adsorbance to filter material to thereby reduce gap size between filter material particles so that fine dust can be captured thereby.

Figure 1:
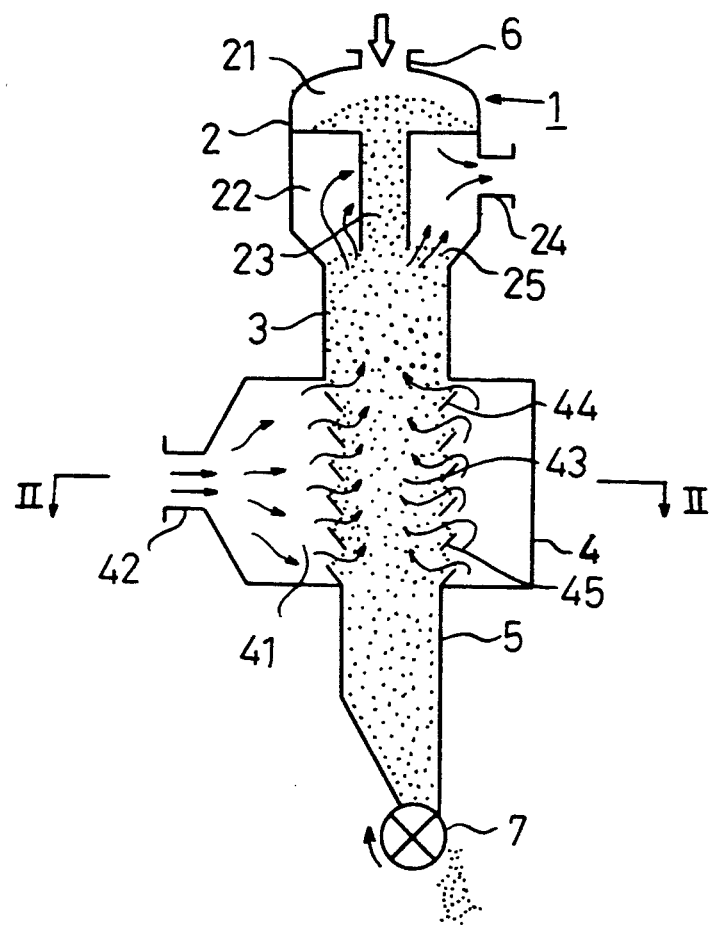
FIG. 1 is a vertical cross section of a moving granular bed type dust removal reaction apparatus according to an embodiment of the present invention.
Figure 2:
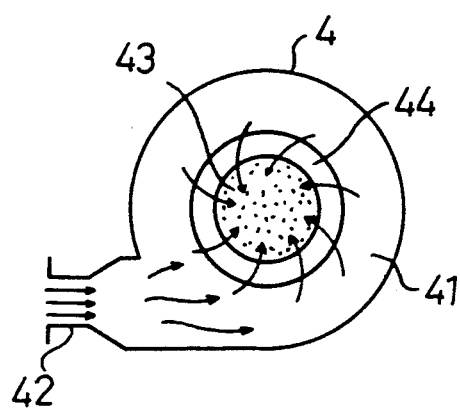
FIG. 2 is a cross section taken along a line II—II in FIG. 1.

Now, a first embodiment of the present invention utilizing these facts will be described with reference to FIGS. 1 and 2, in which FIG. 1 is a cross section of a moving granular bed dust removal and reaction apparatus and FIG. 2 is a cross section taken along line II—II in FIG. 1.

In FIG. 1, the apparatus includes a generally vertically arranged cylindrical air-tight vessel 1 having an enlarged upper portion 2, a reaction agent storage portion 3 arranged below the upper portion 2, a middle portion 4 connected to a lower end of the storage portion 3 and a lower portion 5 connected to a lower end of the middle portion 4. A reaction agent supply port 6 is provided at a top of the upper portion 2. The upper portion 2 includes an upper storage portion 21, a center passage 23 for reaction agent and an annular gas chamber 22 arranged coaxially with the center passage 23. The gas chamber 22 has a gas discharge port 24 formed in a side wall thereof and a bottom portion 25 communicated with the reaction agent storage portion 3. The central passage 23 is connected to the reaction agent supply port 6 so that reaction agent supplied through the supply port 6 can be moved down by gravity. The storage portion has a diameter substantially larger than that of and is communicated with the center passage 23 of the upper portion 2.

The middle portion 4 has an increased diameter and defines an outer annular gas chamber 41 having a gas inlet port 42 and a central passage 43. The annular gas chamber 41 and the central passage 43 of the middle portion 4 are partitioned from each other by a cylindrically arranged louver 44 to define the central passage 43. The central passage 43 is communicated with the reaction agent storage portion 3. The lower portion 5 defines a cylindrical passage communicated with the central passage 43 of the middle portion 4 and has a reaction agent discharge device 7 such as rotary valve provided at a bottom thereof. The cylindrical passage defined by the lower portion 5 has a diameter smaller than that of the central passage 43 of the middle portion 4 which is, in turn, slightly smaller than that of the storage portion 3. Thus, granular reaction agent supplied from the supply port 6 can be moved vertically through a vertical passage formed by a series connection of the center passage 23 of the upper portion 2, the storage portion 3, the center 43 passage defined by the louver 44 of the middle portion 4 and the lower portion 5 by gravity and is discharged suitably through the discharge device 7, with lower moving speed in the storage portion 3 and the central passage 43 to allow better adsorption of contaminant given by the reduction of diameter of the series connected passage.

The louver 44 includes a plurality of vertically arranged fins 45 separated suitably from each other to allow gas to flow from a circumference thereof into the center portion 43 surrounded thereby and having suitable shape, size, space and inclination angle to provide angle of repose for reaction agent flowing down through the center passage 43 so that leakage of agent to the surrounding annular gas chamber 41 is prevented.

The upper surface of the reaction agent filled in the storage portion 3 which forms a bottom of the gas chamber 22 is at rest in a certain level which is given by the angle of repose for the reaction agent.

Gas containing dust, introduced through the gas inlet 42 and diffused in the annular gas chamber 41 flows circumferentially through the louver 45 into the central passage 43 filled with reaction agent to remove relatively large dust particles, passes through reaction agent which flows down at a lower speed in the storage portion 3 while being purified by removing fine dust particles and sulphur compound or nitrogen compound in gas and is discharged through the annular gas chamber 22 and the discharge port 24 of the upper portion 2 of the apparatus horizontally.

Figure 3:
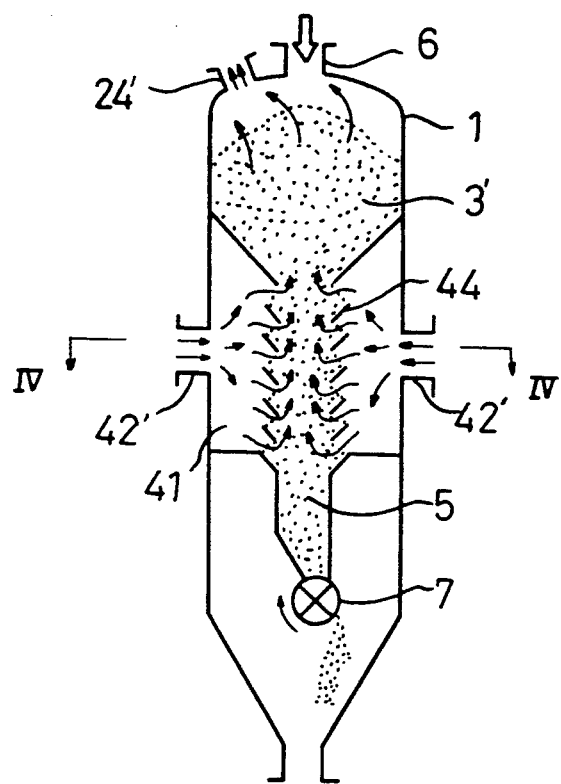
FIG. 3 is a vertical cross section of a moving granular bed type dust removal reaction apparatus according to another embodiment of the present invention.
Figure 4:
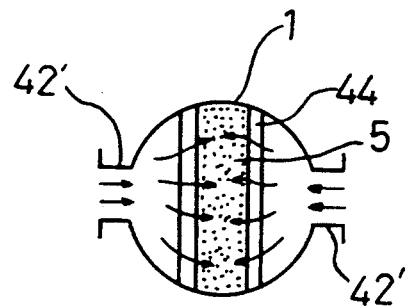
FIG. 4 is a cross section taken along a line IV—IV in FIG. 3.

FIG. 3 shows a second embodiment of the present invention and FIG. 4 is a cross section taken along a line IV—IV in FIG. 3.

In FIGS. 3 and 4, the second embodiment includes a substantially cylindrical air-tight container including an upper storage portion 3' which is formed at a top portion thereof with a reaction agent supply port 6 and a gas discharge port 24' and a tapered bottom portion having a substantially rectangular opening for defining a hopper, a middle portion having a substantially rectangular column defined by a pair of parallel-arranged louvers 44 formed by fins whose angle and shape are determined as in the first embodiment and an air-tight lower portion. The middle portion is provided at opposite sides thereof with gas inlet ports 42' so that gas introduced therethrough in opposite directions can pass through the louvers 44 and flow upwardly through reaction agent filling the rectangular column having an upper end connected to a lower end of the rectangular opening of the upper portion. The lower portion includes a reaction agent discharge mechanism including a discharge device 7, which is substantially the same as that shown in FIG. 1, and connected to a lower end of the rectangular column defined by the louvers of the middle portion.

Reaction agent supplied through the reaction agent supply port 6 of the upper portion of the container 1 flows down to the discharge device 7 to fill a passage extending from the bottom opening of the hopper through the rectangular column defined by the louvers of the middle portion to the discharge device 7 and moves down by gravity at a speed regulated by the device 7. Gas introduced in opposite directions through the gas inlet ports 42' passes through the louvers 44, reaction agent filling the rectangular column defined thereby at a certain speed and then reaction agent in the hopper at a lower speed and discharges through the gas outlet port 24'.

In each of the above mentioned embodiments, large dust particles are filtered out by reaction agent filling the space defined by the louver or louvers while flowing at a higher speed due to a smaller cross area thereof and fine dust particles are filtered out by reaction agent in the storage portion or the hopper while flowing at a lower speed. It should be noted that, although sulphur compound and/or nitrogen compound may be removed by reaction agent in the column defined by the louver or louvers to some extent, substantial removal of these substances is performed while gas passes through reaction agent in the reaction agent storage portion or hopper, since a time for which gas passes through the reaction agent column defined by the louver or louvers is substantially short compared with that for which gas passes through reaction agent in the storage portion.

The advantages offered by the invention are mainly (1) that the facility becomes compact as a whole and handling thereof becomes simple due to the fact that dust removal and reaction/adsorption are performed simultaneously with a single granular processing agent and a single granular bed column, (2) that, in addition to the complete removal of toxic components such as sulphur compounds and/or nitrogen compounds contained in gas due to the fact that, in the final stage, gas passes through the storage portion having a large cross section and a large thickness in gas flow direction at a lower speed with a sufficiently long contact time with reaction agent, it is possible to prevent undesired discharge of gas containing re-scattered dust of collected dust and/or fine particles of reaction agent from the container from occuring due to that a sufficient dust removal is performed in the storage portion, (3) that it is possible to easily regulate the moving speed of reaction agent to an optimum value according to contents of gas, amount of dust contained and flow rate of gas, etc., and (4) that, when used in a high pressure system, it is possible to supply and/or discharge reaction agent while maintaining high pressure.

What is claimed is:

1. A moving granular bed dust removal and reaction apparatus consisting of:
   a generally cylindrical, vertically-disposed, vessel including an upper portion, an intermediate portion connected to and extending vertically below said upper portion and in communication with said upper portion, and a lower portion connected to and disposed beneath said intermediate portion and in communication with said intermediate portion of said vessel, said lower portion having a horizontal sectional area which is smaller than a horizontal sectional area of said upper portion of said vessel;
   means forming a reaction agent supply port and means forming a gas outlet port in said upper portion of said vessel, a reaction agent discharging means at a bottom end of said lower portion of said vessel;
   gas permeable vertical louver means located in said intermediate portion of said vessel and defining with an outer wall of said vessel a gas chamber;
   a gas inlet port in said outer wall in said intermediate portion of said vessel and in communication with said gas chamber for the introduction of gas containing dust into said gas chamber, said vertical louver means being in communication with said upper and lower portions of said vessel, and forming therewith a central, vertical reaction agent passage whereby granular reaction agent introduced into said vessel through said reaction agent supply port flows therethrough from said upper portion to the lower portion of said vessel and through said reaction agent discharge means, thus forming a vertical moving granular bed in said vessel, said louver means being arranged to permit flow of gas from said gas chamber into said reaction agent passage; and
   a counterflow reaction passage being defined by said vertical louver means and said upper portion of the vessel, coincidental with the vertical reaction agent passage, whereby gas containing dust entering the louver means from said gas chamber flows upward through the counterflow reaction passage in counterflow relation to the moving granular bed flowing downward, whereby said gas containing dust initially flows horizontally through said louver means into said counterflow reaction passage and then changes direction so as to flow upwardly through said counterflow reaction passage to said bed for discharge through said gas outlet port, thus performing reaction of, and dust removal from, said gas simultaneously.

* * * * *